Patented Oct. 31, 1922.

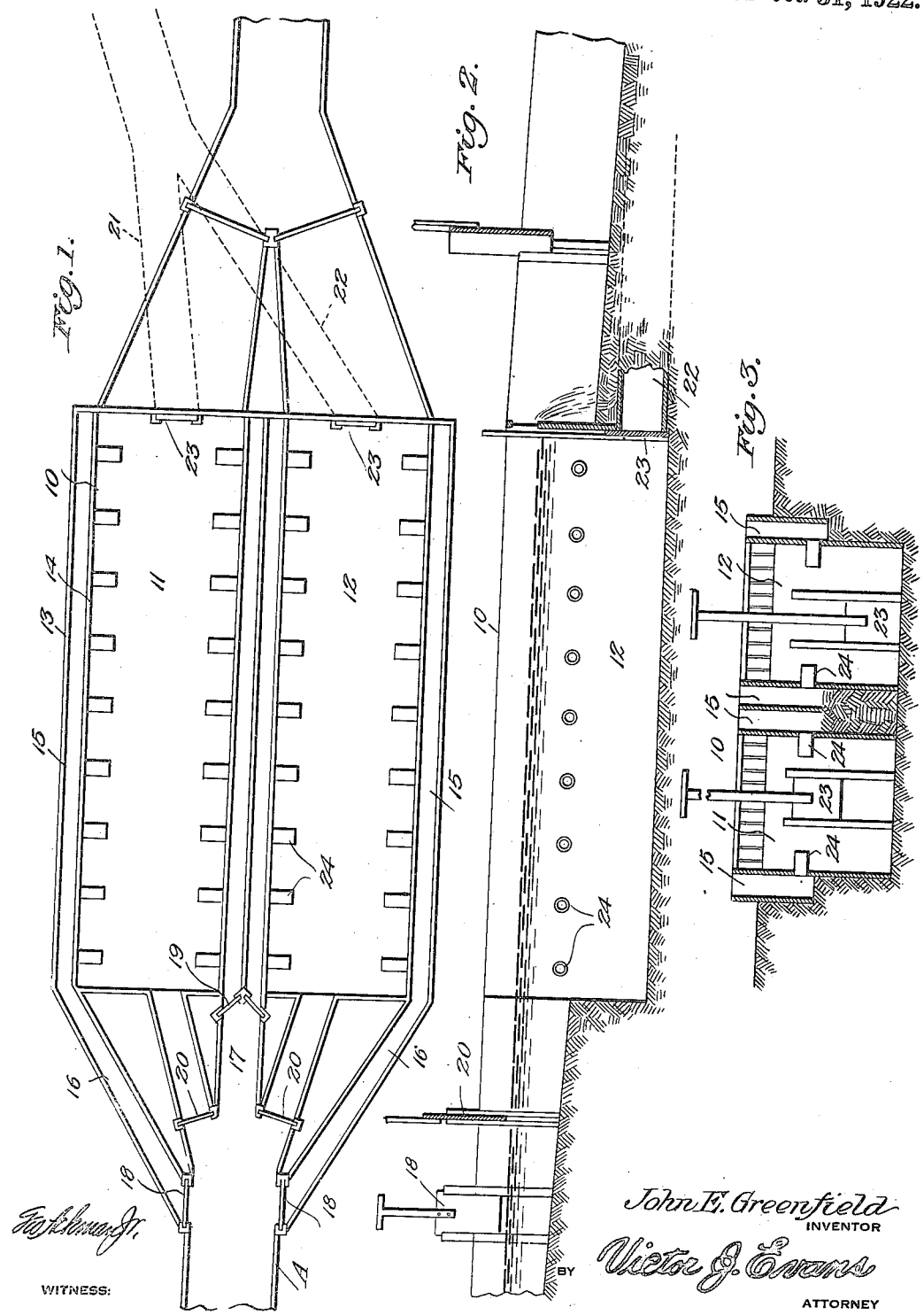

1,434,337

UNITED STATES PATENT OFFICE.

JOHN EARL GREENFIELD, OF EL CENTRO, CALIFORNIA.

DESILTING DEVICE.

Application filed November 28, 1921. Serial No. 518,257.

*To all whom it may concern:*

Be it known that I, JOHN EARL GREENFIELD, a citizen of the United States, residing at El Centro, in the county of Imperial and State of California, have invented new and useful Improvements in Desilting Devices, of which the following is a specification.

This invention relates to irrigating systems, particularly to means for removing silt from the water used for irrigating purposes, and has for its object the provision of a novel desilting device which is so constructed and arranged as not to interfere with the proper flow of water when the same is desired but which will at the same time operate to permit settling of the silt out of the water in a plurality of selectively usable silting basins in which the silt is allowed to settle, means being furthermore provided whereby whichever basin is not in use as a conduit for the water may be sluiced out and consequently cleaned so as to be in a throughly satisfactory condition.

An important and more specific object is the provision of a pair of settling basins interposed in a main irrigating canal and provided with a plurality of gates whereby either settling basin may be used for settling purposes for removing the silt and other matter from the water while the other constitutes a conduit through which the water passes to the lower stretches of the main canal.

A further object is the provision of a device of this character in which each settling basin is provided with a plurality of sluiced pipes and means for conducting water thereto for cleansing and washing out the basin associated therewith.

An additional object is the provision of a device of this character which will be simple and inexpensive in construction and installation, highly efficient in use, durable in service and a general improvement in the art.

With the above and other objects and advantages in view, the invention consists in the details of construction to be hereinafter more fully described and claimed, and illustrated in the accompanying drawings in which, Figure 1 is a plan view of my device, Figure 2 is a longitudinal sectional view and Figure 3 is a cross-sectional view.

Referring more particularly to the drawings, the letter A designates a main irrigating canal within which my desilting device is interposed. In carrying out my invention I provide an enlarged chamber 10 constructed in any desired manner to define a pair of basins 12 and 11 which are similar and which are arranged side by side. Each basin consists of outer and inner walls 13 and 14 respectively which define passages 15 which extend throughout the length of the basins. At one end these passages are closed and at their other ends they communicate with inclined passages 16 and with a common central passage 17 which leads into the main canal A.

The passages 16 and 17 lead into the main canal A at one end of the structure and are provided with gates 18 and 19 respectively which control the inlet of water to the passages. It should also be stated that at this same end of the structure gates 20 are provided for controlling the flow of water to the settling tanks 11 and 12. At the opposite end of the structure both basins 11 and 12 discharge into the main canal and also discharge into sluices 22 and 21, the outlet into these sluices being controlled by suitable gates 23.

Extending inwardly from the inner walls 14 of the settling basins 11 and 12 are discharge pipes 24 which communicate with the spaces 15 and which lead into the interiors of the two settling basins as clearly shown.

The operation of the device is as follows: The main canal A entering both of the settling basins of course conducts the water and ordinarily either one of the sluice gates 20 is opened while the other remains closed, so that the water will pass into either one of the settling basins 11 or 12 as may be desired. The associated gate 23 is left closed so that the water will flow into the basin and will remain therein so that the silt and other matter therein will settle to the bottom. After settling has been effected the gate 23 which has been previously closed is opened to permit the outlet of the water in the usual manner. This operation is of course continued alternately with the settling basins so that the flow of water will be practically continuous. Whenever it is desired to clean out either of the settling basins, it is of course merely necessary that the operator open one of the gates 19 and the associated gate 18 whereupon the water will flow into the passages 15 and will be discharged through the pipes 24 into the settling basin which is full of any desired accumulated matter and this matter will be washed out and loosened so that it will be discharged through either one of the sluices 21 or 22 as the case may be through the sluice gate 23 associated therewith. In this way it will be seen that the flow of water will be uninterrupted but that the two settling basins are used in alteration so that the silt and other desired matter in the water may be settled out of it so that practically only clear water will be discharged into the main canal below the structure.

While I have shown and described the preferred embodiment of the invention, it is of course to be understood that I reserve the right to make such changes in the form, construction and arrangement of parts as will not depart from the spirit of the invention or the scope of the subjoined claims.

Having thus described my invention I claim:

1. In combination with the main canal of an irrigating system, a settling device comprising a pair of settling basins having valve controlled communication with the main canal, sluice gates at the ends of said basins adapted to communicate with sluices independently of the main canal, passages communicating with the main canal and with the settling basins, sluice gates in said passages, and a plurality of pipes communicating with said passages and leading into the basins.

2. In combination with the main canal of an irrigating system, a settling device comprising a pair of settling basins, passages leading to said basins and provided with sluice gates, each of said basins being formed of inner and outer shells defining passages, passages extending from the main canal to said first named passages and provided with control gates, valve control outlet sluices leading from the basins at the outlet end thereof, and a plurality of pipes associated with each basin and communicating with the space thereabout.

3. In combination with an irrigating canal, a settling device comprising a pair of basins each including outer and inner shells defining spaces, a plurality of pipes extending inwardly upon the inner shell and communicating with the spaces between the shells, passages leading from the main canal to the basins and provided with sluice gates, other passages leading from the outlet ends of the basins to the main canal below the structure, valve controlled sluices communicating with the outlet end of the basins and leading to a point remote from the main canal below the structure and a plurality of valve controlled sluice passages leading from the main canal at the inlet end of the structure to the space between the outer and inner shells of the basins.

In testimony whereof I affix my signature.

JOHN EARL GREENFIELD.